Nov. 22, 1960
K. K. NEUHOEFER
2,960,820
PROPULSION UNIT WITH FLUID OPERATED
AUTOMATIC STAGE SWITCH
Filed May 19, 1958
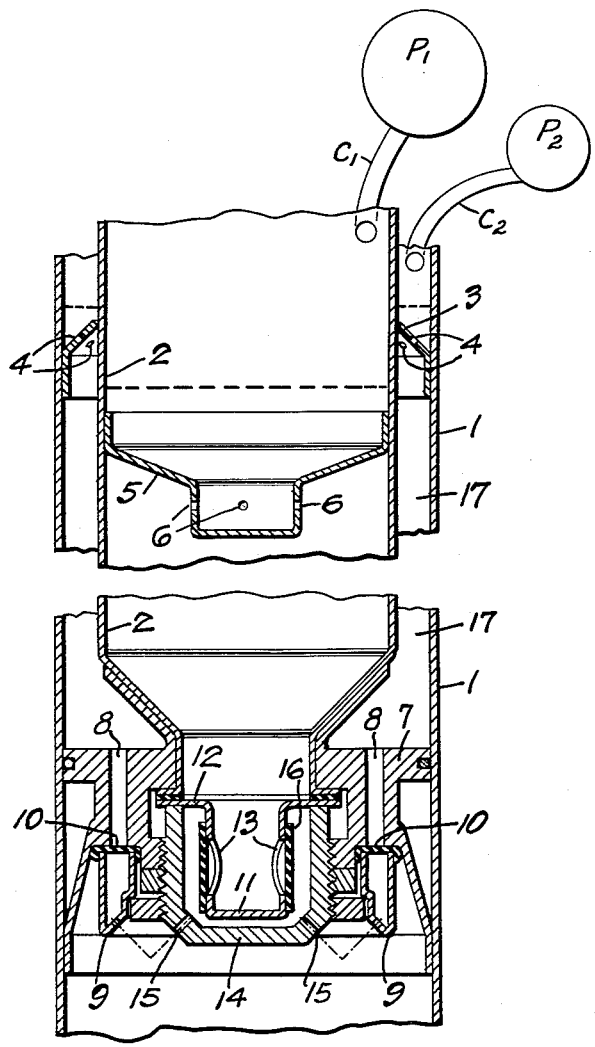
INVENTOR
Kurt K. Neuhoefer
BY
W. E. Thibodeau, A. W. Dew
and D. P. Smith
ATTORNEYS

2,960,820

PROPULSION UNIT WITH FLUID OPERATED AUTOMATIC STAGE SWITCH

Kurt K. Neuhoefer, Monroe, N.Y., assignor to the United States of America as represented by the Secretary of the Army Filed May 19, 1958, Ser. No. 736,411

2 Claims. (Cl. 60—35.6)

(Granted under Title 35, U.S. Code (1952), sec. 266)

The invention described herein may be manufactured and used by or for the Government for governmental purposes without the payment to me of any royalty thereon.

This invention is a fuel injector for rocket combustion chambers or the like.

An object of the invention is to provide a two stage injection ignition system for rocket motors of the type wherein self igniting propellent fluids under pressure are fed to their respective nozzle outlets first at a low pressure for ignition, and after a predetermined time, at a high normal pressure to produce maximum combustion without danger of an explosion.

Another object of the invention is to provide an injector device which is automatic in operation.

Still another object of the invention is to provide an injector having frangible closures in its supply ducts to prevent flow of fluid reactants until a predetermined pressure is applied to such reactants.

A still further object of the invention is to provide a device which is simple in construction and easy to manufacture and assemble.

Other objects and advantages will be apparent from the following detailed description and the accompanying drawing in which the single figure is a fragmentary longitudinal section view of my novel injector device.

In the use of hypergolic, or spontaneously reacting, fluids as a propellant in any form of rocket motor it has been found desirable to have the several tanks pressurized to a proper degree to effect vaporization at the respective nozzles. A thermodynamic study of the ignition of hypergolic propellants has shown that the initial combustion in the combustion chamber should occur under conditions of lower than normal pressure and that after a predetermined time interval to permit temperature rise in the chamber, vaporization of the hypergolic fluid at normal pressure into the combustion chamber will yield optimum starting performance. This function is accomplished in my novel injector without the use of any moving parts as will be explained.

Referring now to the drawing, reference character 1 indicates the cylindrical wall member of the nozzle, disposed within and concentric with such wall member is cylindrical duct member 2 forming a tank 17 therebetween. An annular baffle plate 3 is welded or otherwise firmly affixed between members 1 and 2 substantially as shown and is provided with a plurality of ports or orifices 4 which are very small in diameter but are shown in exaggerated size to illustrate the invention. Within tank member 2 is affixed a hopper baffle 5 having a substantially annular dropped center portion provided with a plurality of ports or orifices 6 which are very small but are shown in enlarged form for clarity of illustration.

A spider member 7 is fixed to wall 1 and to a reduced diameter portion of duct member 2. A series of passages 8 are provided communicating between the tank 17 and a formed annular nozzle channel 9. Frangible discs 10 closing the nozzles are retained within the passages for a purpose that will presently be explained.

A nipple 11 having a turned out flange portion 12 and holes 13 drilled therein is secured to the bottom end of duct member 2 by a nipple 14 which threadedly engages a portion of the spider member substantially as shown. Holes 15 provided in the lower portion of the nipple form a nozzle to cooperate with the nozzle 9 in the hypergolic combustion. A cylindrical frangible member 16 is normally held on the nipple to close the holes 13.

In operation the volumes of reactants formed above the plates 3 and 5 as shown by the dotted lines are selected as equal to that volume which will pass through the constricted passages in the plates during the predetermined time of lower than normal pressure combustion. The volume formed in tank 17 between plate 3 and spider 7 is selected as adequate for containing a reactant during the time of normal pressure combustion, and the volume of the tank of member 2 and between baffle 5 and nipple 11 is selected as adequate for containing the other reactant during such time of normal pressure combustion. When the tanks are filled to the levels indicated by the lines and a normal air pressure is applied thereto from pressure sources $P_1$ and $P_2$ through conduits $C_1$ and $C_2$ leading therein the frangible closures are ruptured and the reactants are thrown from the nozzles substantially as shown; but at a pressure lower than the normal pressure applied from the conduits because of the pressure drop or throttling action across constricted passages 4, 6 in plates 3 and 5, respectively. The liquid level is selected so that the liquids will have been forced through the constricted passages and the levels will fall below the plates when sufficient of the reactants have been thrown from the nozzles at the lower pressure to initiate combustion in the combustion chamber. When the liquid level drops below plates 3, 5 the throttling action is substantially decreased because of the greater ease of the passage of pressured gas through the passages, and substantially full normal pressure is applied to the reactants at nozzles 15, 9 whereby they are vaporized to start and maintain normal combustion for the duration of the supply within the body.

It will be understood that the degree of throttling is a function of the area of the passages and the ratio of the viscosities of the liquid and gas. Obviously a gas such as hydrogen may be used instead of air since its viscosity is only 0.0084 centipose at 32° F. as opposed to air having a viscosity of 0.0171 centipoise at 32° F.

While I have disclosed a form of the invention presently preferred by me, various changes and modifications will occur to those skilled in the art after a study of the present disclosure. Hence the disclosure is to be taken in an illustrative rather than a limiting sense; and it is my desire and intention to reserve all modifications falling within the scope of the subjoined claims.

Having now fully disclosed the invention, what I claim and desire to secure by Letters Patent is:

1. The combination of a propulsion unit comprising: a combustion chamber, fluid injecting nozzles terminating within said chamber, fluid containing tanks, ducts connecting said tanks with said nozzles, a first and second fluid, under pressure, contained in each tank, orifice means located within each tank and disposed therein so that a predetermined volume of first fluid within each tank will be forced therethrough followed in sequence by said second fluid, such sequential flow thereby causing a low initial discharge rate at the nozzles due to the relative high viscosity of said first fluids in passing through said orifices and a relatively higher nozzle discharge rate when said second fluid, relatively less viscous, passes through said orifices.

2. The structure as set forth in claim 1 wherein said tanks comprise first and second concentric cylinders, the volume of said first cylinder comprising one tank and the volume formed between said first and second cylinders comprising the other tank, said first fluid being a hypergolic reactant and said second fluid being a gaseous medium.

References Cited in the file of this patent

UNITED STATES PATENTS 2,402,826    Lubbock _____ June 25, 1946